(12) United States Patent
Lee

(10) Patent No.: US 7,062,263 B2
(45) Date of Patent: Jun. 13, 2006

(54) FAST TRAFFIC CHANNEL RECONNECTION SYSTEM AND METHOD

(75) Inventor: Anthony Lee, San Diego, CA (US)

(73) Assignee: VIA Telecom Co., Ltd. (KY)

( * ) Notice: Subject to any disclaimer, the term of this patent is extended or adjusted under 35 U.S.C. 154(b) by 261 days.

(21) Appl. No.: 10/434,416

(22) Filed: May 8, 2003

(65) Prior Publication Data

US 2004/0005883 A1    Jan. 8, 2004

Related U.S. Application Data (60) Provisional application No. 60/379,375, filed on May 8, 2002.

(51) Int. Cl.
*H04Q 7/20*    (2006.01)

(52) U.S. Cl. ............... 455/422.1; 455/434; 455/425; 455/435.1; 455/450

(58) Field of Classification Search ............... 455/33.2, 455/34.1, 54.1, 574, 442, 343.2, 422.1, 434, 455/450, 435.1, 425
See application file for complete search history.

(56) References Cited

U.S. PATENT DOCUMENTS

| | | | | |
|---|---|---|---|---|
| 5,613,204 A | * | 3/1997 | Haberman et al. ....... | 455/432.3 |
| 5,924,026 A | * | 7/1999 | Krishnan ................. | 455/414.1 |
| 6,889,067 B1 | * | 5/2005 | Willey ........................ | 455/574 |
| 2003/0032430 A1 | | 2/2003 | Lee ............................ | 455/436 |
| 2003/0039231 A1 | * | 2/2003 | Sinnarajah et al. ......... | 370/335 |

OTHER PUBLICATIONS

Wang, et al., "IS2000 Sync Channel Issue", Sync Channel Workaround Solutions, 3GPP2 Discussion, Nov. 1, 2001, pp. 1-15.

Wang, et al., "IS2000 Synch Channel Issue", Synch Channel Workaround Solutions, 3GPP2 Discussion, Oct. 3, 2001, pp. 1-14.

Lee, et al., "LSI Comments on "Direct to Idle"", 3GPP2 Discussion, Nov. 5, 2001, pp. 1-6.

Wang, et al., "IS2000 Sync Channel Issue", SyncChannel Workaround Solutions, 3GPP2 Discussions, Nov. 5, 2001, pp. 1-15.

* cited by examiner

*Primary Examiner*—Erika A. Gary
*Assistant Examiner*—Wayne Cai
(74) *Attorney, Agent, or Firm*—Jaquez & Associates; Martin J. Jaquez (57) ABSTRACT

A method and apparatus for reducing call setup latency for a wireless device in a cellular network where the wireless device receives, stores, and analyzes base station overhead information to reduce the need to perform initialization after a call session terminates.

40 Claims, 7 Drawing Sheets

FAST TRAFFIC CHANNEL RECONNECTION SYSTEM AND METHOD

CROSS REFERENCE TO RELATED APPLICATIONS—CLAIM OF PRIORITY

This invention is related and claims priority under 35 USC 119 to U.S. Provisional Application No. 60/379,375, filed May 8, 2002, and entitled "Fast Traffic Channel Reconnection with Base Station Assistance", the contents of which are hereby incorporated in their entirety by reference.

BACKGROUND

1. Field of the Invention

The invention relates to methods and apparatus for wirelessly communicating data and voice signals between a base station and a mobile unit, and more particularly, to a method and apparatus for reducing call setup latency.

2. Description of Related Art

In cellular networks a mobile unit or wireless device conducts calls via a base station. The wireless device must interact with the base station using predetermined protocols that are commonly standardized. The interaction protocol standards may evolve but the base station must be able to support different generations of protocol standards. In some systems, the base station standardization compatibility requirements disadvantageously increases call setup latency. For example, the Code Division Multiple Access ("CDMA") IS2000A standard dictates that a wireless unit performs base station connection initialization after each call terminates. This requirement increases the call setup latency for such wireless devices. The increased latency is unacceptable for many data calls.

Therefore, a need exists for a cellular system and method that reduce call setup latency. The present invention provides such a cellular system and method.

SUMMARY OF THE INVENTION

The present invention relates to a system, wireless device, method, and article of manufacture for communicating data signals using a cellular network, the cellular network including a plurality of base stations coupled to the cellular network.

In one exemplary embodiment the invention receives and stores base station overhead information. The invention processes the received base station overhead information to determine whether the received base station overhead information is current for one of the plurality of base stations after a call session is completed. The wireless device may have an active base station set that includes a sub-set of the plurality of base stations. In this embodiment, when a call session ends with the at least one of the plurality of base stations, the invention receives overhead information related to each base station in the active base station set. In an exemplary embodiment the cellular network is a CDMA based network and the base station overhead parameters includes at least one of the following parameters: Pseudo-random Noise Offset, CDMA channel number, CDMA Band Class, Station Identifier, Network Identifier pair, Protocol Revision, BCCH code channel, BCCH data rate, BCCH coding rate, PCH code channel, and PCH data rate. In this embodiment, the invention may determine whether the BCCH parameters for a base station are current. The invention may also determine whether the PCH parameters for a base station are current.

Reduced call setup latency is achieved using the fast traffic channel reconnection system and method of the present invention. Using the present inventive fast traffic channel reconnection techniques and apparatus, a mobile station can access traffic channels in much less time than was heretofore available using the prior art techniques. For example, using the fast traffic channel reconnection methods and apparatus of the present invention, a mobile station accesses the traffic channel approximately one hundred times faster than what was heretofore possible using the prior art approaches. This reduction in traffic channel access time significantly reduces call setup latencies when placing packet data calls.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1:
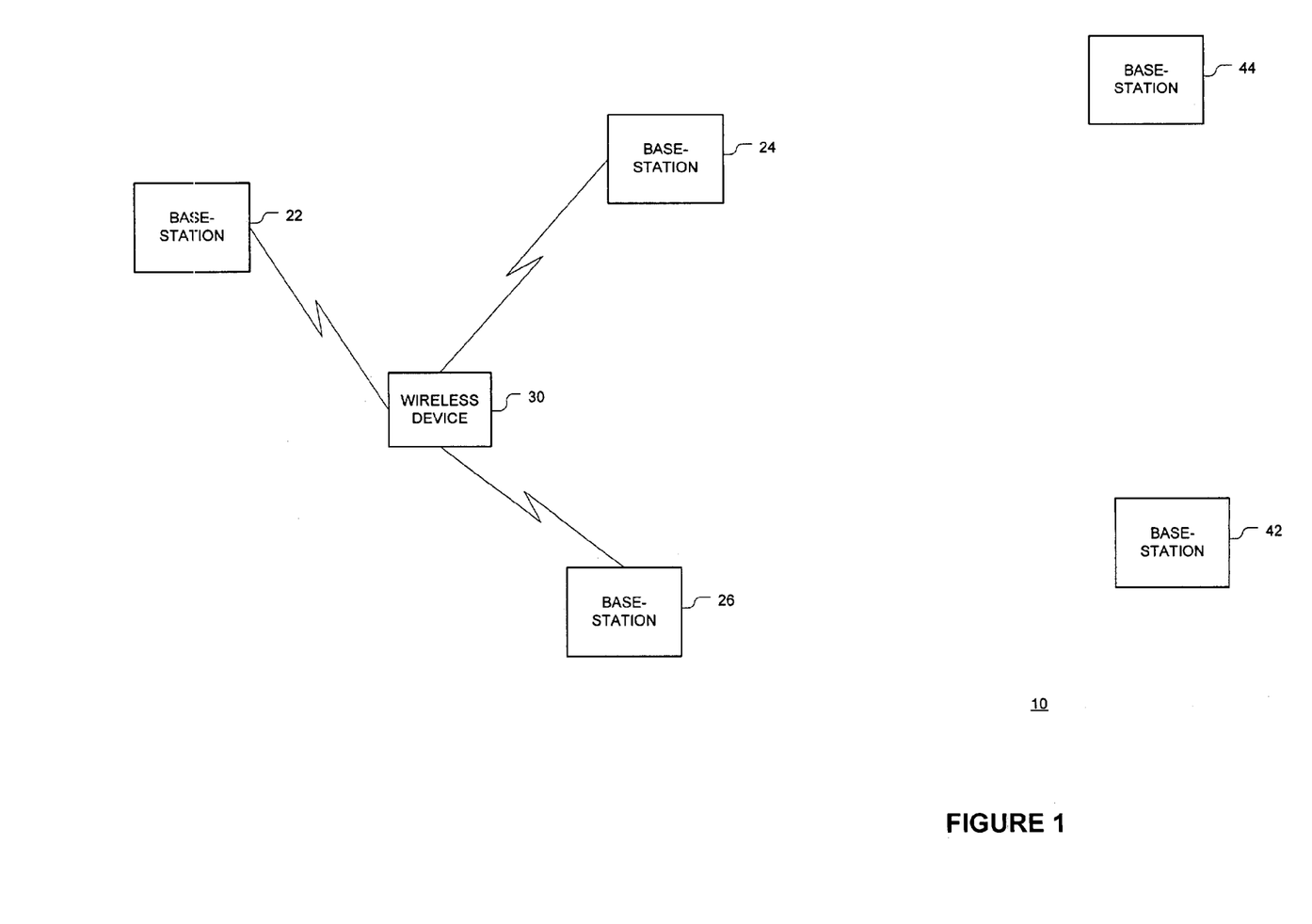
FIG. 1 is an illustration of a wireless device in a cellular system comprising a plurality of base stations.

FIG. 1 is a block diagram of a cellular system segment 10 in which the present invention may be employed. In this segment 10, there are a plurality of base stations 22, 24, 26, 42, and 44 that are geographically separated and a wireless device 30. The wireless device may be any wireless apparatus that includes a cellular Modulator/Demodulator ("modem") that may communicate with a base station 22, 24, 26, 42, or 46. For example, the wireless device may be a cellular telephone, personal data assistant ("PDA"), or computer. In one embodiment, each base station may communicate with the wireless device when the signal strength of the wireless device, as received at a base station, is sufficiently strong. In one invention embodiment, the base stations support the same wireless communication protocol standard (such as the IS2000A standard). In another embodiment of the invention, the base stations may support different or multiple communication protocol standards. In addition, the wireless device 30 may support a single or multiple communication protocol standards, e.g., the device 30 may support a CDMA standard, an Advanced Mobile Phone Service ("AMPS") standard, a Time Division Multiple Access ("TDMA") standard, and a Groupe Special Mobile ("GSM") standard. In the example shown in FIG. 1, the wireless device 30 is capable of communicating with all of the base stations 22, 24, 26, 44, or 46 using a CDMA standard.

Figure 2:
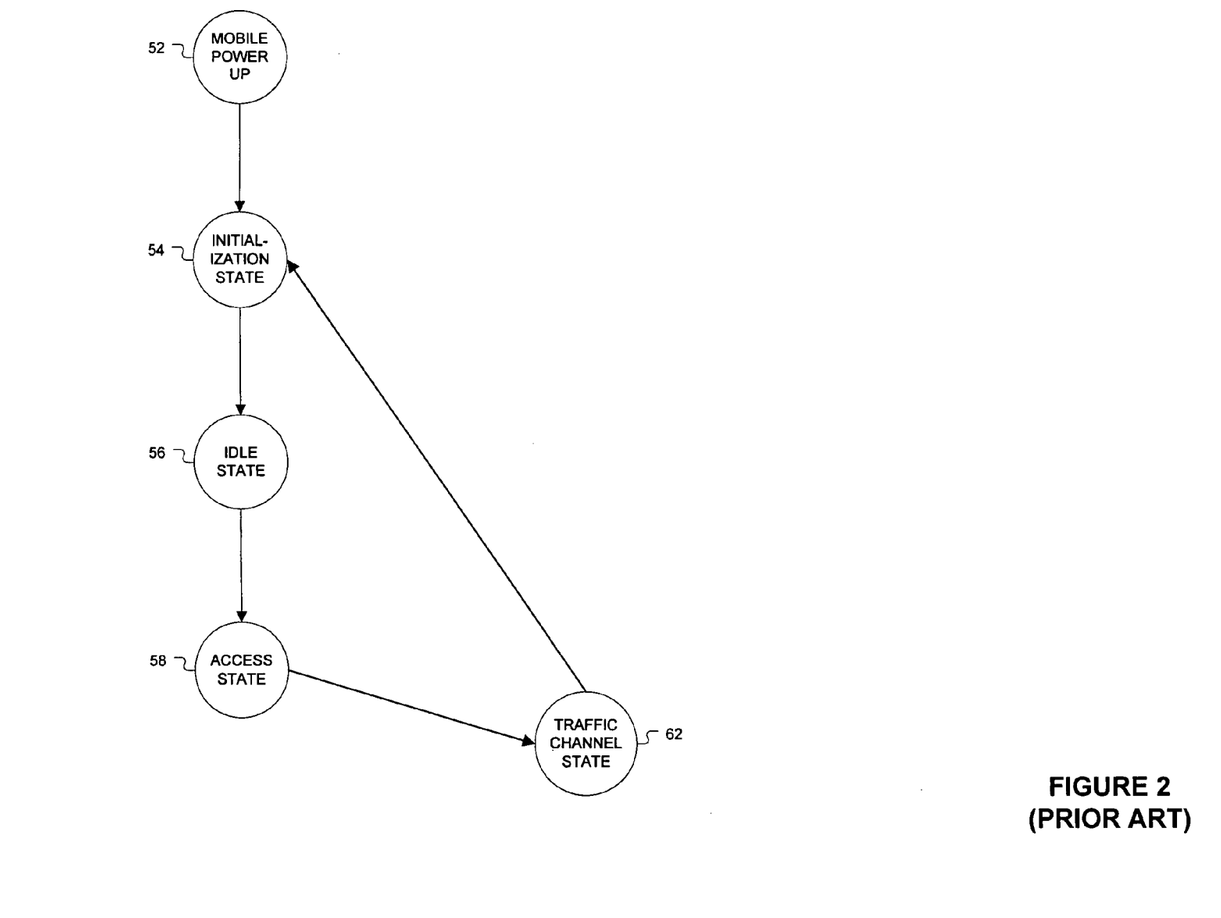
FIG. 2 is an illustration of a wireless device state diagram used in prior art devices.

FIG. 2 (Prior Art) is an illustration of a wireless device state diagram based on the CDMA IS2000A standard. More specifically, FIG. 2 (Prior Art) shows how a wireless device functions under Release 0 of the CDMA IS2000 standard without BCCH. After the wireless device 30 is powered up (state 52), the device is initialized (and control is passed to the initialization state 54). Under the CDMA IS2000A standard, for example, the device 30 acquires a pilot signal from a base station. The device 30 must then acquire the synchronization channel, system time, and any overhead messages. Control then passes to the idle state 56. During this state, the wireless device monitors overhead messages to maintain pilot signal acquisition. When a call is initiated (incoming or outgoing) a base station grants, or the wireless device 30 requests, access to a traffic channel (access state 58). When a base station grants a traffic channel to the wireless device 30 the wireless device conducts the call (traffic channel state 62). In the CDMA IS2000A standard, when a call is complete, the wireless device must perform initialization again (i.e., return to the initialization state 54).

Figure 3:
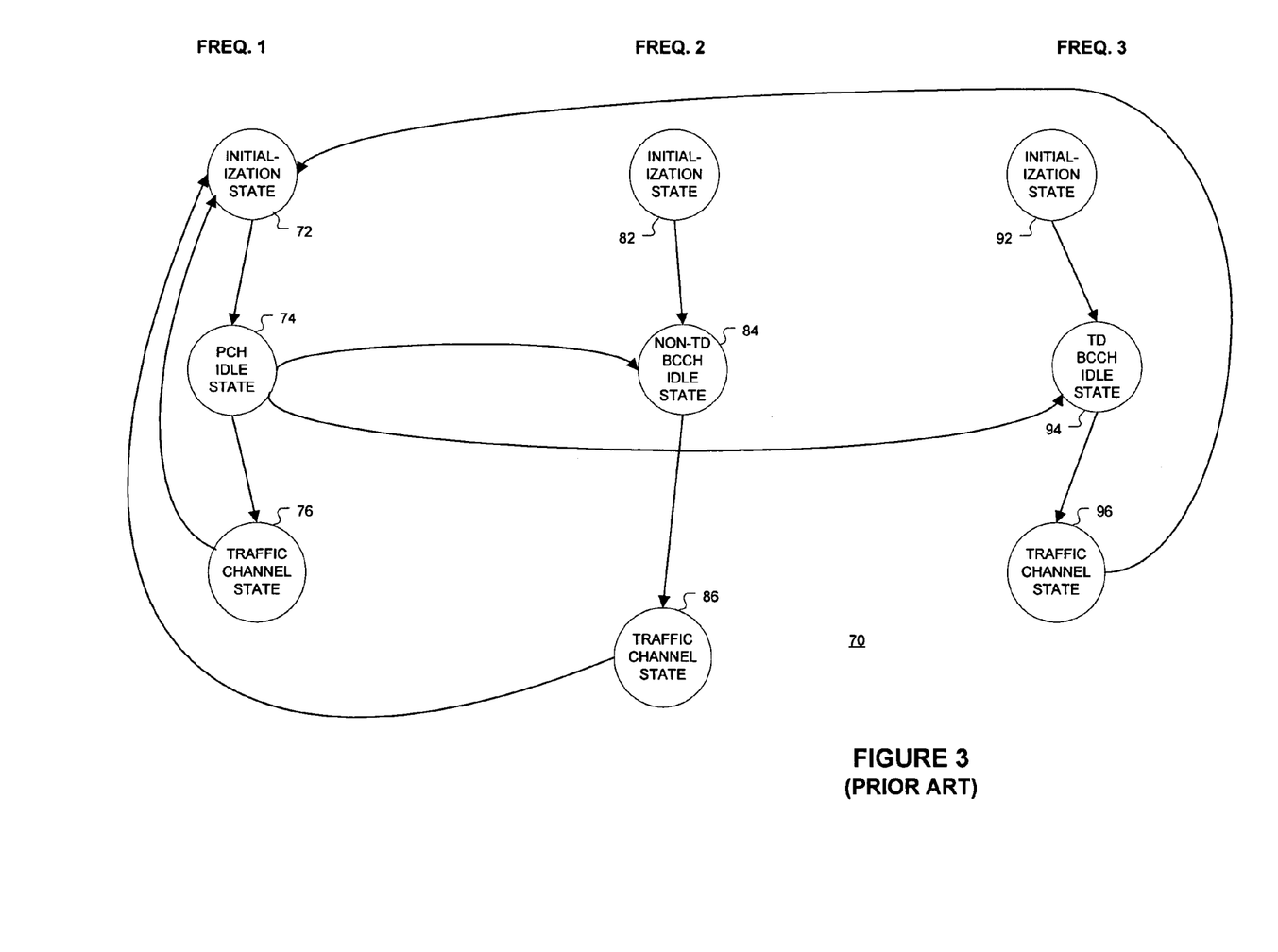
FIG. 3 is an illustration of a wireless device state diagram where the cellular system does not employ fast channel reconnection techniques.

When the call is used to communicate (transmit and/or receive) packet data, the actual time spent by the wireless device in the traffic channel state may be shorter than the time spent in the initialization 54, idle 56, and access 58 states. This is an inefficient use of bandwidth and reduces the potential upload or download packet data rate of the wireless device. FIG. 3 is another illustration of a wireless device state diagram that may occur in a cellular system using the CDMA IS2000A standard. More specifically, FIG. 3 shows how the wireless device functions in accordance with the CDMA IS2000 Release A with BCCH. In this state diagram 70, the wireless device 30 starts at the initialization state 72 and transitions to the idle state 74 based on a pilot signal that is acquired from a base station transmitting on Freq. 1. A base station may then direct the wireless device to a different CDMA channel that is transmitted on another frequency, with a Non-TD BCCH (wherein "TD" stands for "Transmit Diversity") transmitted on Freq. 2 (i.e., state 84) or a TD BCCH pilot signal transmitted on Freq. 3 (i.e., state 94). In any of these idle states 74, 84, or 94, after completing a call (from a traffic state 76, 86, or 96, respectively), the wireless device is directed to acquire a pilot signal on Freq. 1 (initialization state 72 versus initialization states 82 or 92). In one embodiment of the present invention, after completion of a call, the wireless device returns to its most recent idle state 74, 84, or 94, as shown in FIG. 4.

Figure 4:
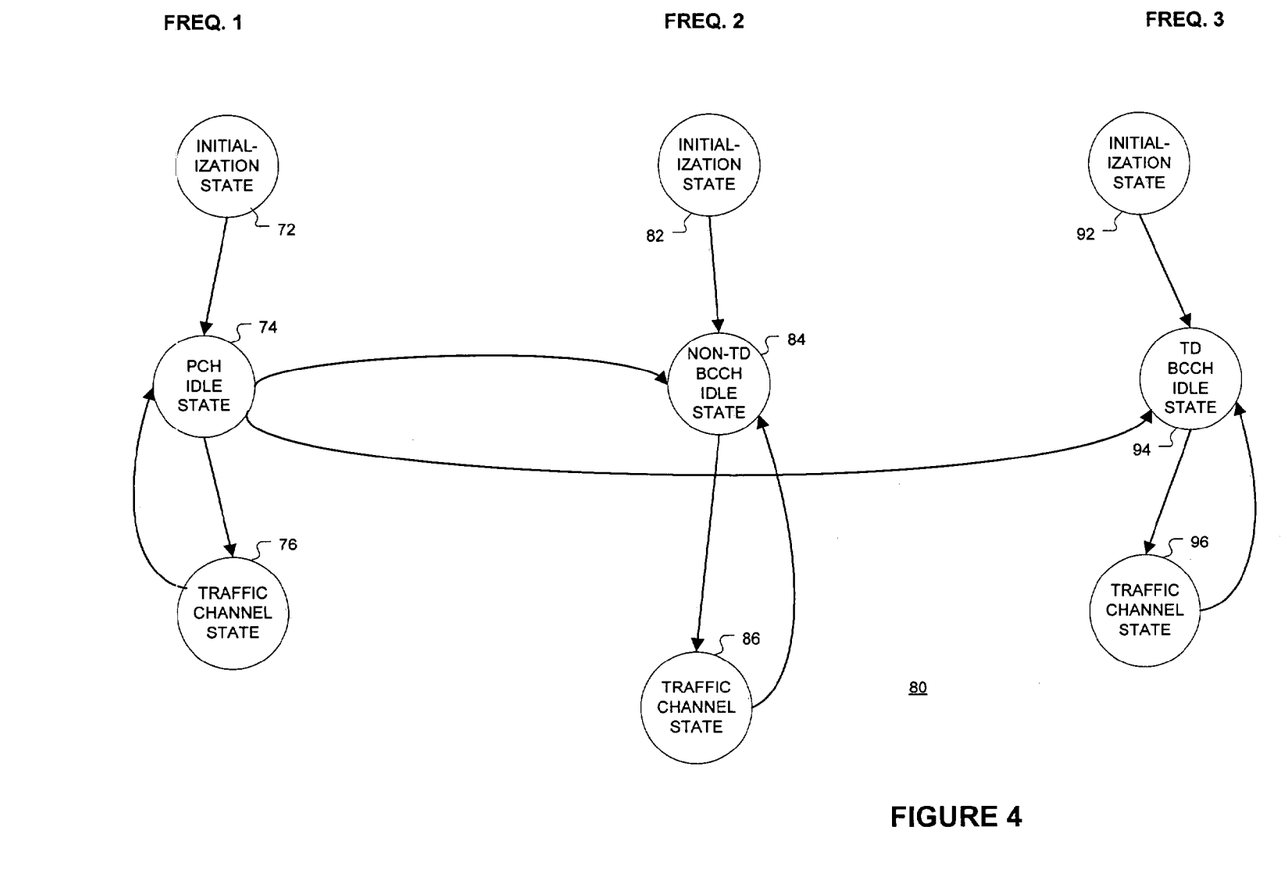
FIG. 4 is an illustration of a wireless device state diagram where the cellular system employs fast channel reconnection techniques in accordance with an embodiment of the present invention.
Figure 7:
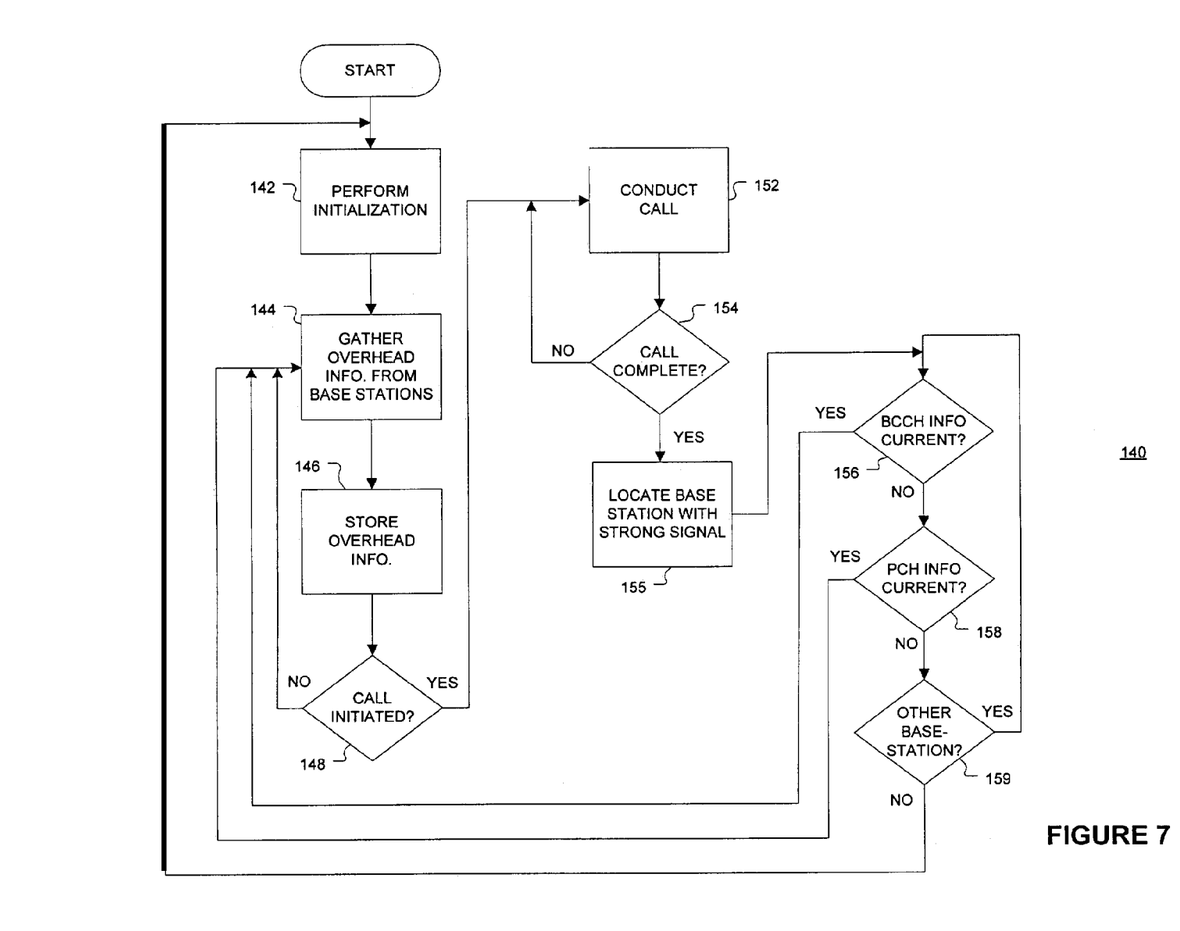
FIG. 7 is a flowchart of an exemplary fast channel reconnection method for use in a wireless device in accordance with the present invention.

FIG. 4 is an illustration of a wireless device state diagram that may occur in a cellular system using a modified CDMA IS2000A standard in accordance with an embodiment of the present invention. As shown in FIG. 4, control ideally passes from a traffic channel state 76, 86, and 96 to the corresponding idle state 74, 84, and 94, respectively. FIG. 7 illustrates an exemplary wireless device fast channel reconnection method 140 in accordance with the present invention shown in flowchart format. The method 140 reduces the likelihood that initialization will be required after a call session is complete so control may therefore return directly to an idle state after a traffic session state. The method 140 directs the wireless device 30 to perform initialization at a step 142 (go to initialization state) upon startup. The method then gathers overhead information from each base station it visits (step 144) (such as, for example, the base stations 22, 24, 26 of FIG. 1). The method 140 then stores the overhead information (step 146). The method 140 ideally gathers and stores all of the overhead information that is necessary to achieve an idle state with the base station. In a CDMA based system, for example, the method 140 may gather and store the following overhead information: Pseudorandom Noise ("PN") Offset, CDMA channel number, CDMA Band Class, Station Identifier ("SID"), Network Identifier ("NID") pair, Protocol Revision ("P_REV"), BCCH code channel, BCCH data rate, BCCH coding rate, PCH code channel, and PCH data rate.

Those skilled in the wireless communications arts shall recognize that none, any one of, or all of the overhead information parameters given above may be gathered or stored by the method 140. For example, in one embodiment, the method 140 may gather and store only one of the overhead information parameters given above. In another exemplary embodiment, the method 140 may gather and store two or more of the parameters, while in yet another exemplary embodiment, the method 140 may gather and store all of the overhead information parameters. The scope of the present invention is intended to encompass all of these embodiments. In an embodiment where the wireless device supports different cellular networks using differing standards, the wireless device may gather and store overhead information from base stations for each supported cellular network.

When the wireless device 30 moves geographically, it may gather and store overhead information from other base stations (such as the base stations 42 and 44 shown in FIG. 1). In an exemplary embodiment, while the wireless device is in an idle state, base stations may determine when the signal strength of the wireless device 30 is sufficiently strong for a future call session. In this embodiment, the method 140 may only gather and store overhead information from base stations that indicate that the signal strength of the device is sufficiently strong. The method 140 continues to gather and store base station overhead information until a call is initiated (step 148). After the call is conducted and completed (steps 152 and 154), the method 140 searches for a base station having sufficient signal strength for a future call session (step 155). The method 140 then determines whether stored overhead information (if any is present) for the located base station is current (steps 156 and 158 in one embodiment). When the information is current the method returns to the idle state, whereat the wireless device gathers and stores base station overhead information until another call is initiated. There may be other base stations that have a sufficiently strong signal for a future call session (i.e., base stations in the active set of the wireless device). In an exemplary embodiment, the method checks the stored overhead information related to all such base stations (steps 156, 158, and 159) until a current set is located in steps 156 or 158.

Otherwise, the method 140 performs a full initialization procedure (step 142). In an embodiment wherein the wireless device supports different cellular networks, the wireless device may analyze base stations in another supported cellular network before returning to an initialization state (step 142). In the exemplary CDMA network, the method 140 determines whether the stored BCCH overhead information (if any is present) for the base station being analyzed (step 156) is current. When the BCCH information is current, control returns to the idle state (steps 144, 146). Otherwise, the method determines whether the stored PCH overhead information (if any) for the base station being analyzed (step 158) is current. When the PCH information is current, control returns to the idle state (steps 144, 146). When the wireless device 30 is fairly stationary during a call (traffic channel state) the method 140 should be able to return the wireless device 30 to an idle state. When the wireless device 30 moves during a call (traffic channel state), or some overhead information changes for a base station during a call session, the method 140 may not be able to return the wireless device 30 to an idle state without first performing initialization (step 142).

Figure 8:
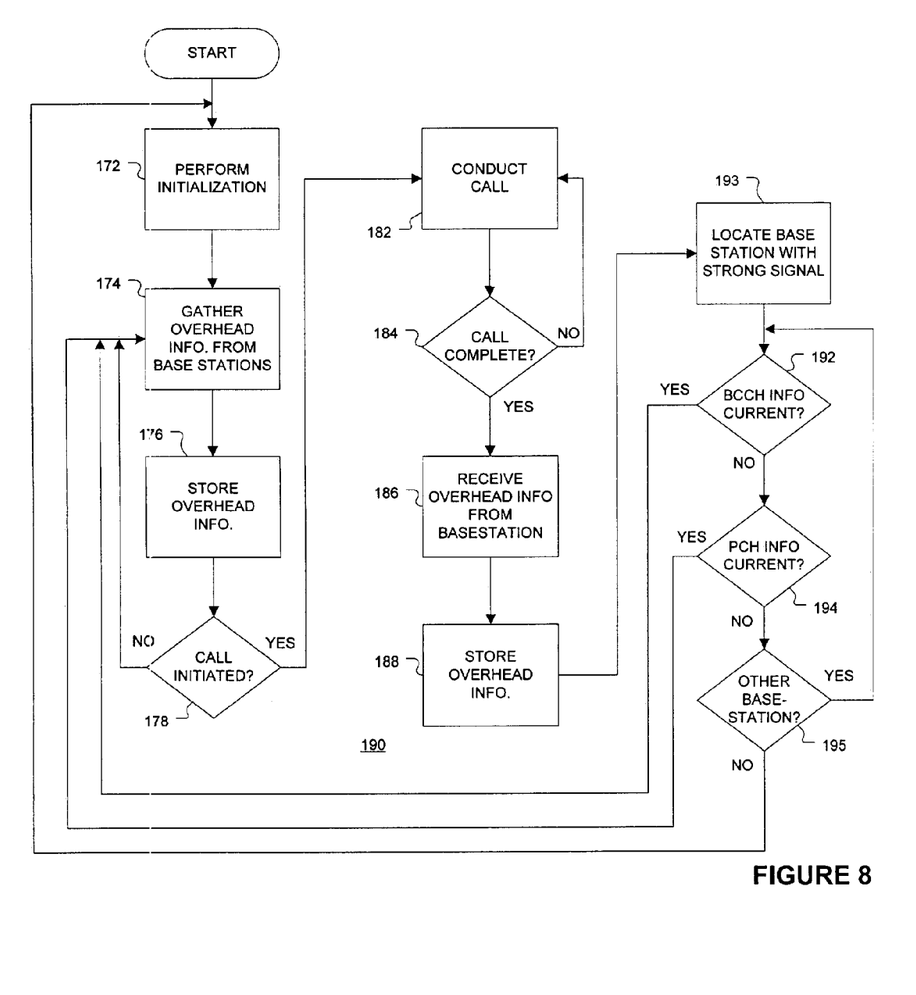
FIG. 8 is a flowchart of another exemplary fast channel reconnection method that works in conjunction with the method shown in FIG. 9.
Figure 9:
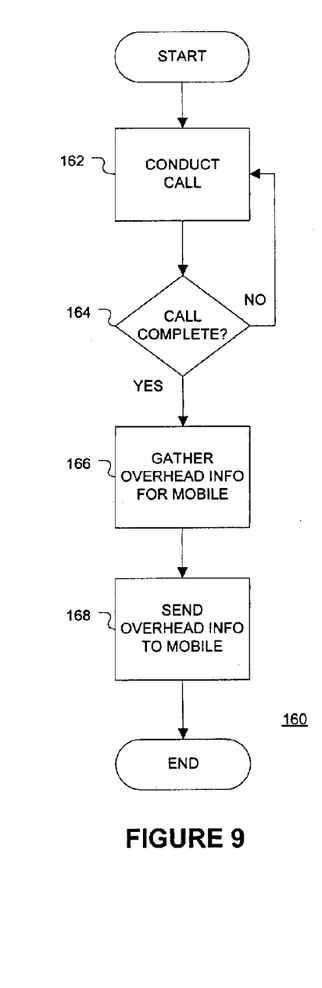
FIG. 9 is a flowchart of a base station fast channel reconnection method that works in conjunction with the method shown in FIG. 8.

FIG. 8 illustrates another exemplary wireless device fast channel reconnection method 190 that works in conjunction with the method 160 shown in FIG. 9. This method further reduces the likelihood that initialization is needed after termination of a call session. FIG. 9 illustrates a base station fast channel reconnection method 160 that works in conjunction with the method 190 shown in FIG. 8 in accordance with the present invention. The method 190 is similar to the method 140 (FIG. 7) in that the method also gathers and stores overhead information from base stations in the active set of the wireless device during idle states until a call is initiated (steps 174, 176, 178, 182, and 184). However, unlike the method 140, the method 190 receives updated overhead information for base stations in the active set of the wireless device after a call session is completed (step 186). The wireless device 30 receives the updated overhead information from the base station that is conducting/completing the call session (step 168 of FIG. 9).

In a CDMA-based system, the base station method 160 sends the wireless device 30 updated overhead parameters including the following overhead parameters: the Pseudorandom Noise ("PN") Offset, CDMA channel number, CDMA Band Class, Station Identifier ("SID"), Network Identifier ("NID") pair, BCCH code channel, BCCH data rate, BCCH coding rate, PCH code channel, and PCH data rate for each base station in the active set of the wireless device. Similar to the wireless device fast channel reconnection method 140 described above with reference to FIG. 7, those skilled in the wireless communications arts shall recognize that none, any one of, or all of the overhead parameters given above may be sent to the wireless device using the base station method 160. For example, in one embodiment, the base station method 160 may send only one of the overhead parameters given above. In another exemplary embodiment, the base station method 160 send two or more of the overhead parameters, while in yet another exemplary embodiment, the method 160 may send all of the overhead information parameters. The scope of the present invention is intended to encompass all of these embodiments.

The base station method 160 does not transmit the Protocol Revision ("P_REV") information because the base station software is unlikely to have been updated during the call session. In another embodiment, the method 160 may also send the Protocol Revision ("P_REV") information so the base station may dynamically update its software. The method 190 of FIG. 8 stores these updated overhead parameters (step 188) and uses the updated information to perform steps 193, 192, 194, and 195 (these steps are analogous to steps 155, 156, 158, and 159, respectively, of the method 140 shown in FIG. 7).

In this exemplary embodiment, the base station conducting the call session with the wireless device performs the method 160 shown in FIG. 9. In accordance with the method 160, the base station is instructed to gather overhead information related to the base stations in the active set of the wireless device (step 166). The method 160 transmits the updated active set overhead information to the wireless device (step 168). The method 190 (FIG. 8) stores the updated active set overhead information and uses this information to proceed to an idle state with a base station (steps 193, 192, 194, and step 195).

Figure 5:
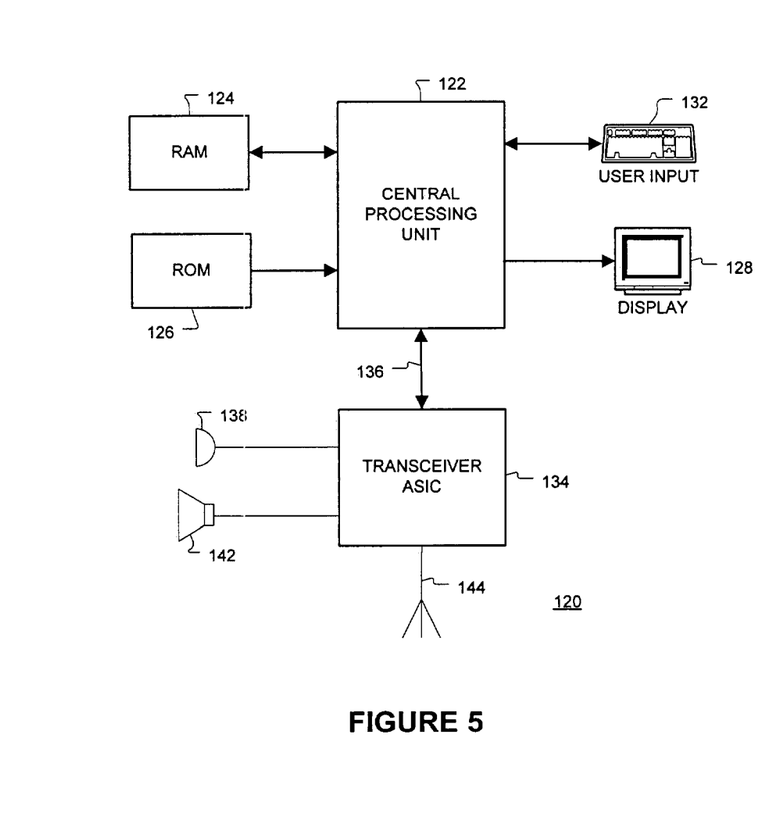
FIG. 5 is a block diagram of an exemplary wireless device that may be used to practice the present invention.

FIG. 5 is a block diagram of an exemplary wireless device 120 that may be used to practice the present invention. The exemplary device 120 may include a central processing unit ("CPU") 122, random access memory ("RAM") 124, read only memory ("ROM") 126, a display 128, a user input device 132, a transceiver application specific integrated circuit ("ASIC") 134, a microphone 138, a speaker 142, and an antenna 144. The ROM 126 is coupled to the CPU 122 and stores the program instructions to be executed by the CPU 122. The RAM 124 is coupled to the CPU 122 and stores temporary program data and gathered overhead information. The user-input device 132 may comprise an input device such as a keypad, touch pad screen, track ball or other input device that allows the user to navigate through menus in order to place calls, in addition to performing other functions. The display 128 is an output device such as a CRT, LCD or other screen display that enables the user to read received data and to place calls.

The microphone 138 and speaker 142 may be incorporated in a handset that is coupled to the ASIC 134. The microphone 138 and speaker 142 may also be separated from the handset to allow hands-free communication. In this mode, the ASIC 134 may include voice activation circuitry that may convert voice commands into data. The data is transmitted to the CPU 122 via a serial bus 136 and may include a telephone number to be dialed.

The transceiver ASIC 134 includes the instruction set that is necessary to communicate data and voice signals over the cellular network 10. In one embodiment, the transceiver ASIC 134 is a code division multiple access ("CDMA") ASIC and the cellular network is a CDMA network that supports data and voice communication. The ASIC 134 is coupled to the antenna 144 for communicating signals with the cellular network 10. When a data signal is received by the transceiver ASIC 134, the data is transferred to the CPU 122 via the serial bus 136. The data can include the base station overhead information to be stored by the wireless device in accordance with the methods described above. The ASIC 134 may perform the method 140 described above with reference to FIG. 7, or the method 190 described above with reference to FIG. 8, and it may direct the CPU 22 to store the gathered overhead information.

Figure 6:
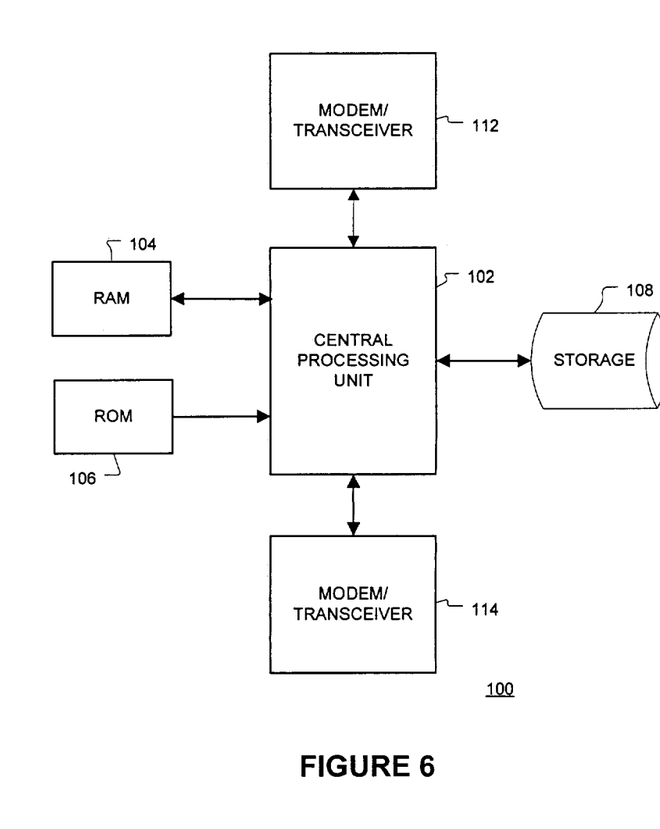
FIG. 6 is a block diagram of an exemplary base station that may be used to practice the present invention.

FIG. 6 illustrates a block diagram of an exemplary base station 100 that may be used in the present invention. The exemplary base station 100 may include a CPU 102, a RAM 104, a ROM 106, a storage unit 108, a first modem/transceiver 112 and a second modem/transceiver 114. The first modem/transceiver 112 may couple, in a well-known manner, the base station 100 to a central cellular network control center via an Internet connection or Plain Old Telephone System ("POTS"). The second modem/transceiver 114 couples the base station 100 to the cellular network 10. The modem/transceiver 114 may be an Ethernet modem, telephone modem, wireless modem or other communication device that communicates with the cellular network 10 (FIG. 1). The CPU 102 directs communications between the first and second modem, 112 and 114, respectively, for messages between the central network control center, Internet, or POTS, and one or more wireless devices.

The ROM 106 may store program instructions to be executed by the CPU 102 including instructions necessary to implement the method 160 shown in FIG. 9. The RAM 104 may be used to store temporary program information and overhead information for other base stations in its sector (i.e., nearby base stations). The storage unit 108 may comprise any convenient form of data storage and may be used to store the overhead information.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code on a network for remote execution.

What is claimed is:

1. A system for communicating data signals using a cellular network, comprising:
   a plurality of base stations coupled to the cellular network, each base station of the plurality of base stations including means for transmitting base station overhead information; and
   a wireless device coupled to the cellular network, the wireless device including:
   a) means for performing base station acquisition initialization steps including acquiring a pilot signal from and establishing synchronization with at least an initialization one of the plurality of base stations while in a base station acquisition initialization state;
   b) means for conducting a first call session with at least one of the plurality of base stations after performing the base station acquisition initialization steps and exiting the base station acquisition initialization state of means (a);
   c) means for receiving the base station overhead information;
   d) means for storing the received base station overhead information;
   e) means for processing the received base station overhead information to determine whether the received base station overhead information is current for one of the plurality of base stations after a call session is completed; and
   f) means for beginning a second call session with at least one of the plurality of base stations subsequent to conducting the first call session and prior to reentering the base station acquisition initialization state of means (a).

2. The system of claim 1, wherein the base station acquisition initialization means (a) of the wireless device further functions to acquire a synchronization channel and a system clock of the initialization base station.

3. The system of claim 2, wherein the wireless device maintains an active base station set that includes a sub-set of the plurality of base stations.

4. The system of claim 3, wherein at least one of the plurality of base stations includes means for transmitting overhead information for each base station in the active base station set when a call session ends.

5. The system of claim 4, wherein the cellular network is a CDMA based network and wherein the base station overhead information includes at least one of the following overhead parameters: a Pseudorandom Noise Offset, a CDMA channel number, a CDMA Band Class, a Station Identifier, a Network Identifier pair, a Protocol Revision, a BCCH code channel, a BCCH data rate, a BCCH coding rate, a PCH code channel, and a PCH data rate.

6. The system of claim 4, wherein the cellular network is a CDMA based network and wherein the overhead information includes at least one of the following BCCH overhead parameters: a BCCH code channel, a BCCH data rate, and a BCCH coding rate.

7. The system of claim 4, wherein the cellular network is a CDMA based network and wherein the overhead information includes at least one of the following PCH overhead parameters: a PCH code channel and a PCH data rate.

8. The system of claim 7, wherein the processing means determines whether the PCH overhead parameters for a base station are current.

9. The system of claim 4, wherein the cellular network is a CDMA based network and wherein the overhead information includes at least one of the following overhead parameters: a BCCH code channel, a BCCH data rate, a BCCH coding rate, a PCH code channel, and a PCH data rate.

10. The system of claim 9, wherein the processing means determines whether BCCH overhead parameters for a base station, including the BCCH code channel, the BCCH data rate, and the BCCH coding rate, are current.

11. A wireless device for communicating data signals using a cellular network, the cellular network including a plurality of base stations coupled to the cellular network, comprising:
   a) means for initializing base station acquisition with at least an initialization one of the plurality of base stations through a base station acquisition initialization process that includes acquiring a pilot signal from and establishing synchronization with the initialization base station;
   b) means for conducting a first call session with at least one of the plurality of base stations after completing the base station acquisition initialization process;
   c) means for receiving base station overhead information;
   d) means for storing the received base station overhead information;
   e) means for processing the received base station overhead information to determine whether the received base station overhead information is current for one of the plurality of base stations after a call session is completed; and f) means for beginning a second call session with one of the plurality of base stations following step (b) and prior to performing a further base station acquisition initialization process.

12. The wireless device of claim 11, wherein the base station acquisition initializing means (a) of the wireless device further functions to acquire a synchronization channel and a system time of the initialization base station.

13. The wireless device of claim 12, wherein the wireless device maintains an active base station set that includes a sub-set of the plurality of base stations.

14. The wireless device of claim 13, wherein the means for receiving base station overhead information includes means for receiving overhead information for each base station in the active base station set when a call session ends.

15. The wireless device of claim 14, wherein the cellular network is a CDMA based network and the overhead information includes at least one of the following overhead parameters: a Pseudorandom Noise Offset, a CDMA channel number, a CDMA Band Class, a Station Identifier, a Network Identifier pair, a Protocol Revision, a BCCH code channel, a BCCH data rate, a BCCH coding rate, a PCH code channel, and a PCH data rate.

16. The wireless device of claim 14, wherein the cellular network is a CDMA based network and the overhead information includes at least one of the following BCCH overhead parameters: a BCCH code channel, a BCCH data rate, and a BCCH coding rate.

17. The wireless device of claim 14, wherein the cellular network is a CDMA based network and the overhead information includes at least one of the following PCH overhead parameters: a PCH code channel and a PCH data rate.

18. The wireless device of claim 14, wherein the cellular network is a CDMA based network and the overhead information includes at least one of the following overhead parameters: a BCCH code channel, a BCCH data rate, a BCCH coding rate, a PCH code channel, and a PCH data rate.

19. The wireless device of claim 18, wherein the processing means determines whether BCCH overhead parameters for a base station, including the BCCH code channel, the BCCH data rate and the BCCH coding rate, are current.

20. The wireless device of claim 18, wherein the processing means determines whether PCH overhead parameters for a base station, including the PCH code channel and the PCH data rate, are current.

21. A method for a wireless device to communicate data signals in a cellular network, the cellular network including a plurality of base stations coupled to the cellular network, the method comprising the steps of:
a) entering a base station acquisition initialization state and performing therein base station acquisition initialization steps including acquiring a pilot signal from and establishing synchronization with at least an initialization one of the plurality of base stations;
b) conducting and completing a first call session with at least one of the plurality of base stations after completing the base station acquisition initialization steps and exiting the base station acquisition initialization state of step (a);
c) receiving base station overhead information;
d) storing the received base station overhead information;

e) processing the received base station overhead information to determine whether the received base station overhead information is current for one of the plurality of base stations after the first call session is completed; and f) beginning a second call session with one of the plurality of base stations following step (b) and prior to entering a further base station acquisition initialization state of step (a) in which the base station acquisition initialization steps are performed.

22. The method of claim 21, wherein the base station acquisition initialization steps performed in step (a) further include acquiring a synchronization channel and acquiring a system time of the initialization base station.

23. The method of claim 22, wherein the wireless device maintains an active base station set that includes a sub-set of the plurality of base stations.

24. The method of claim 23, wherein the step of receiving the base station overhead information includes receiving overhead information for each base station in the active base station set when a call session ends.

25. The method of claim 24, wherein the cellular network is a CDMA based network and the overhead information includes at least one of the following overhead parameters: a Pseudorandom Noise Offset, a CDMA channel number, a CDMA Band Class, a Station Identifier, a Network Identifier pair, a Protocol Revision, a BCCH code channel, a BCCH data rate, a BCCH coding rate, a PCH code channel, and a PCH data rate.

26. The method of claim 24, wherein the cellular network is a CDMA based network and the overhead information includes at least one of the following BCCH overhead parameters: a BCCH code channel, a BCCH data rate, and a BCCH coding rate.

27. The method of claim 24, wherein the cellular network is a CDMA based network and the overhead information includes at least one of the following PCH overhead parameters: a PCH code channel and a PCH data rate.

28. The method of claim 24, wherein the cellular network is a CDMA based network and the overhead information includes at least one of the following overhead parameters: a BCCH code channel, a BCCH data rate, a BCCH coding rate, a PCH code channel, and a PCH data rate.

29. The method of claim 28, wherein the processing step includes determining whether BCCH overhead parameters for a base station, including the BCCH code channel, the BCCH data rate, and the BCCH coding rate, are current.

30. The method of claim 28, wherein the processing step includes determining whether PCH overhead parameters for a base station, including the PCH code channel and the PCH data rate, are current.

31. An article of manufacture for use in a wireless device communicating data signals in a cellular network, the cellular network including a plurality of base stations coupled to the cellular network, the article of manufacture comprising computer readable storage media including program logic embedded therein that causes control circuitry to perform the steps of:
a) entering a base station acquisition initialization state and performing therein base station acquisition initialization steps including acquiring a pilot signal from and establishing synchronization with at least an initialization one of the plurality of base stations;
b) conducting and completing a first call session with at least one of the plurality of base stations after completing step (a);

c) receiving base station overhead information;
d) storing the received base station overhead information;
e) processing the received base station overhead information to determine whether the received base station overhead information is current for one of the plurality of base stations after the first call session is completed; and
f) beginning a second call session with one of the plurality of base stations following step (b) and prior to performing step (a) again.

32. The article of manufacture of claim 31, wherein the program logic causes control circuitry to perform further base station acquisition initialization steps of acquiring a synchronization channel and acquiring a system time in respect of the initialization base station.

33. The article of manufacture of claim 32, wherein the wireless device maintains an active base station set that includes a sub-set of the plurality of base stations.

34. The article of manufacture of claim 33, wherein the step of receiving base station overhead information includes receiving overhead information for each base station in the active base station set when a call session ends.

35. The article of manufacture of claim 34, wherein the cellular network is a CDMA based network and the overhead information includes at least one of the following overhead parameters: a Pseudorandom Noise Offset, a CDMA channel number, a CDMA Band Class, a Station Identifier, a Network Identifier pair, a Protocol Revision, a BCCH code channel, a BCCH data rate, a BCCH coding rate, a PCH code channel, and a PCH data rate.

36. The article of manufacture of claim 34, wherein the cellular network is a CDMA based network and the overhead information includes at least one of the following BCCH overhead parameters: a BCCH code channel, a BCCH data rate, and a BCCH coding rate.

37. The article of manufacture of claim 34, wherein the cellular network is a CDMA based network and the overhead information includes at least one of the following PCH overhead parameters: a PCH code channel and a PCH data rate.

38. The article of manufacture of claim 34, wherein the cellular network is a CDMA based network and the overhead information includes at least one of the following overhead parameters: a BCCH code channel, a BCCH data rate, a BCCH coding rate, a PCH code channel, and a PCH data rate.

39. The article of manufacture of claim 38, wherein the processing step includes determining whether BCCH overhead parameters for a base station, including the BCCH code channel, the BCCH data rate, and the BCCH coding rate, are current.

40. The article of manufacture of claim 38, wherein the processing step includes determining whether PCH overhead parameters for a base station, including the PCH code channel and the PCH data rate, are current.

* * * * *